May 8, 1956     W. M. MINER     2,744,376
LAWN MOWER
Filed Nov. 1, 1954
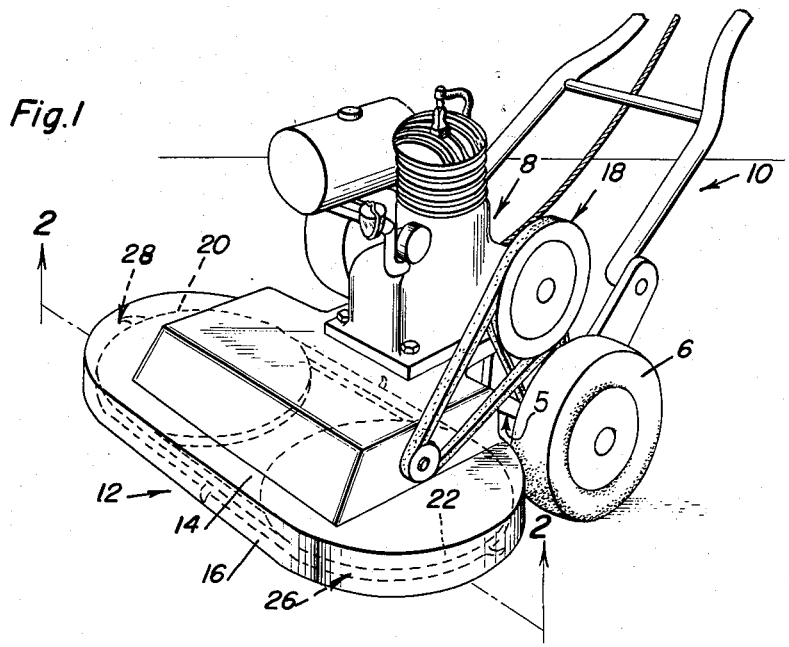
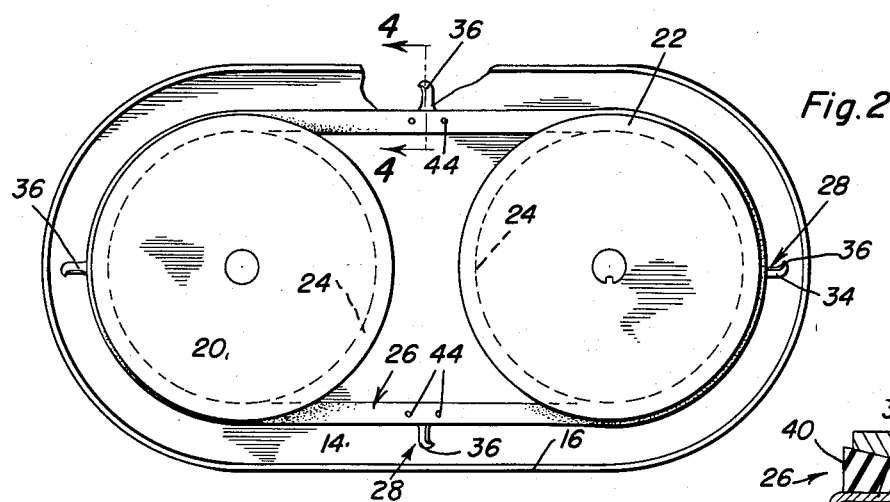
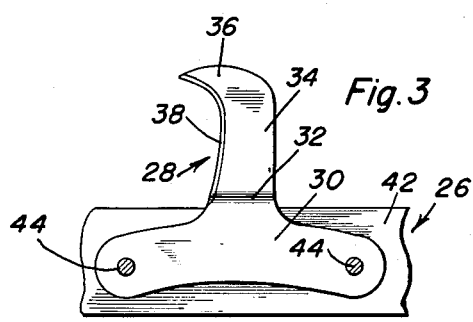
William M. Miner
INVENTOR.

United States Patent Office 2,744,376
Patented May 8, 1956

2,744,376

LAWN MOWER

William M. Miner, Wagoner, Okla.

Application November 1, 1954, Serial No. 466,050

1 Claim. (Cl. 56—244)

The present invention relates to certain new and useful improvements in a power-operated, manually-guided and maneuverable lawn mower which is characterized, generally speaking, by a handle-equipped frame having a power generating motor thereon and provided with supporting and transporting wheels.

An object of the invention, generally speaking, is to improve upon and reduce the number of parts entering into the combination, thereby not only increasing the efficiency of the structure as a whole, but also rendering the same less costly to manufacture and otherwise simplify factors of assembling and sale.

A similar general object is to structurally, functionally and otherwise improve upon similarly constructed and performing prior art power-operated lawn mowers and, in doing so, to provide a construction in which manufacturers and users will find their respective needs and requirements aptly taken into consideration and satisfactorily met.

More specifically, the invention has to do with an appropriately constructed guard, a pair of coplanar pulleys mounted for rotation within the confines of the guard and having their cooperating peripheral portions encircled by a specially constructed V-belt, said belt carrying circumferentially spaced clipping and cutting blades.

Other objects, features and advantages will become more readily apparent from the following description and the accompanying sheet of illustrative drawings.

In the drawings:

Figure 1 is a perspective view of a power-driven lawn mower constructed in accordance with the principles of the prevent invention;

Figure 2 is an enlarged view taken on the horizontal line 2—2 of Figure 1 looking in the direction of the arrows;

Figure 3 is an enlarged fragmentary detail view; and

Fig. 4 is an enlarged section on the line 4—4 of Figure 2, looking in the direction of the arrows.

Referring now to the drawings with the aid of reference numerals and lead lines, and with reference first to Figure 1, it will be evident that the frame 5, not detailed, may be of any appropriate construction so far as the instant invention is concerned. Supported on the frame are ground-engaging and transporting rollers, one of which is shown in the drawings and denoted by the numeral 6. The numeral 8 denotes any suitable prime mover, such as an internal combustion engine or an electric motor, and this is suitably mounted on the frame. The handle means is denoted at 10.

As before stated, the invention has to do with the cutter means and this includes, among other features, a suitable inverted fan-like guard or shield which is mounted on the frame and is denoted by the numeral 12. It comprises a flat horizontal top plate 14 and a skirt-like marginal guard flange 16 which is vertically disposed and has its lower edge in a plane to properly clear the lawn surface. Any suitable means, generally denoted as at 18, transmits motion from the motor to cutter driving means and is preferably made up of a pair of rotatably mounted, coplanar pulleys 20 and 22 having peripheral V-shaped grooves 24 to accommodate a V-shaped endless belt broadly referred to here as a V-belt 26. This belt carries circumferentially spaced cutters 28. Each cutter comprises a shank which is L-shaped in edge elevation and embodies a horizontal attaching portion 30 and a flat vertical depending portion 32 carrying the cutting blade 34. The cutting blade 34 is at right angles to the vertical portion 32, is in a horizontal plane and has a hook-shaped pointed bill or beak 36 and an appropriately shaped cooperating cutting edge 38, as perhaps best shown in Figure 3. The blade-equipped belt, when mounted on the pulleys, is such that the cutting blades are all coplanar and are in a plane below the lowermost plane of the pulley 20, as brought out in Fig. 4. The belt is preferably made up of upper and lower half-sections 40 and 42 which are secured together by rivets 44 and which rivets also serve to secure the shank portions 30 between the belt sections. It follows, therefore, that the invention has to do primarily with the specially designed, circumferentially spaced cutters shown in Figures 3 and 4 carried by a belt or chain driven by coplanar pulleys receiving motion from an appropriate prime mover. The construction is of course such that the cutters are substantially within the confines of the guard for obvious safety purposes.

Since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

In combination, a support, a cutter assembly mounted for operation on said support and embodying a pair of substantially duplicate coplanar pulleys mounted for rotation on said support, said pulleys having peripheral grooves therein, an endless belt mounted on said pulleys and operable in the cooperating grooves of the respective pulleys, said belt being made up of duplicated upper and lower complemental sections, and a plurality of cooperating cutters, each cutter comprising a shank which is L-shaped in edge elevation and embodies a horizontal attaching portion fitted and fixed between adjacent surfaces of said belt sections, a depending vertical complemental portion joined with said horizontal attaching portion and paralleling the outer peripheral surface of the lowermost belt section and depending below the bottom of said last namd belt section, and an integral cutting blade carried by the lower end of said vertical depending portion and projecting radially beyond said peripheral surface and having a terminal pointed beak, said blade and beak having cooperating cutting edges.

References Cited in the file of this patent

UNITED STATES PATENTS

| | | |
|---|---|---|
| 2,497,573 | Apple | Feb. 14, 1950 |
| 2,514,861 | Hackerott | July 11, 1950 |
| 2,539,199 | Murray | Jan. 23, 1951 |
| 2,543,386 | Templeton | Feb. 27, 1951 |